US008237770B2

(12) United States Patent
Kenoyer et al.

(10) Patent No.: US 8,237,770 B2
(45) Date of Patent: *Aug. 7, 2012

(54) AUDIO BASED ON SPEAKER POSITION AND/OR CONFERENCE LOCATION

(75) Inventors: Michael L. Kenoyer, Austin, TX (US); William V. Oxford, Austin, TX (US)

(73) Assignee: LifeSize Communications, Inc., Austin, TX (US)

( * ) Notice: Subject to any disclaimer, the term of this patent is extended or adjusted under 35 U.S.C. 154(b) by 1840 days.

This patent is subject to a terminal disclaimer.

(21) Appl. No.: 11/406,071

(22) Filed: Apr. 18, 2006

(65) Prior Publication Data
US 2006/0256983 A1 Nov. 16, 2006

Related U.S. Application Data (63) Continuation-in-part of application No. 11/252,188, filed on Oct. 17, 2005, now Pat. No. 7,667,728.

(60) Provisional application No. 60/619,212, filed on Oct. 15, 2004, provisional application No. 60/676,918, filed on May 2, 2005, provisional application No. 60/675,965, filed on Apr. 29, 2005, provisional application No. 60/675,962, filed on Apr. 29, 2005.

(51) Int. Cl.
*H04N 7/14* (2006.01)
(52) U.S. Cl. ............... 348/14.08; 381/123; 379/202.01
(58) Field of Classification Search .... 348/14.01–14.16; 381/91, 92, 122, 58, 123; 379/202.01, 406.01
See application file for complete search history.

(56) References Cited

U.S. PATENT DOCUMENTS

| 5,034,947 | A | | 7/1991 | Epps |
| 5,054,021 | A | | 10/1991 | Epps |
| 5,617,539 | A | | 4/1997 | Ludwig et al. |
| 5,657,096 | A | | 8/1997 | Lukacs |
| 5,689,641 | A | | 11/1997 | Ludwig et al. |
| 5,737,011 | A | | 4/1998 | Lukacs |
| 5,737,431 | A | | 4/1998 | Brandstein et al. |
| 5,751,338 | A | | 5/1998 | Ludwig, Jr. |
| 5,764,277 | A | | 6/1998 | Loui et al. |
| 5,896,128 | A | * | 4/1999 | Boyer .......................... 715/716 |
| 6,072,522 | A | * | 6/2000 | Ippolito et al. ............... 348/14.1 |

(Continued)

OTHER PUBLICATIONS

"A history of video conferencing (VC) technology" http://web.archive.org/web/20030622161425/http://myhome.hanafos.com/~soonjp/vchx.html (web archive dated Jun. 22, 2003); 5 pages.

(Continued)

*Primary Examiner* — Xu Mei
(74) *Attorney, Agent, or Firm* — Meyertons Hood Kivlin Kower & Goetzel, P.C.; Jeffrey C. Hood (57) ABSTRACT

In various embodiments, a system may include a first conferencing system with a first speaker and a second speaker. The first conferencing system may be coupled to a second conferencing system and a third conferencing system. In some embodiments, audio from the second conferencing system may be reproduced through the first speaker, and audio from the third conferencing system may be reproduced through the second speaker. In some embodiments, audio from various participants at various conferencing systems may be reproduced on audio system components relative to the location of participants at the conferencing system. For example, audio from a first participant on the left side of a camera at a second conferencing system may be reproduced through left side speakers at the first conferencing system.

34 Claims, 8 Drawing Sheets

U.S. PATENT DOCUMENTS

| | | | |
|---|---|---|---|
| 6,587,823 | B1 | 7/2003 | Kang et al. |
| 6,590,604 | B1 | 7/2003 | Tucker et al. |
| 6,593,956 | B1 | 7/2003 | Potts et al. |
| 6,594,688 | B2 | 7/2003 | Ludwig et al. |
| 6,731,334 | B1* | 5/2004 | Maeng et al. ............ 348/211.12 |
| 6,816,904 | B1 | 11/2004 | Ludwig et al. |
| 6,822,507 | B2 | 11/2004 | Buchele |
| 6,912,178 | B2 | 6/2005 | Chu et al. |
| 6,980,485 | B2 | 12/2005 | McCaskill |
| 7,012,630 | B2* | 3/2006 | Curry et al. ................ 348/14.08 |
| 7,130,428 | B2 | 10/2006 | Hirai et al. |
| 7,339,605 | B2* | 3/2008 | Rodman et al. ............ 348/14.07 |
| 7,612,793 | B2 | 11/2009 | Potekhin et al. |
| 7,667,728 | B2* | 2/2010 | Kenoyer et al. ............ 348/14.08 |
| 7,668,345 | B2* | 2/2010 | Kiyohara et al. ............. 382/115 |
| 7,924,655 | B2* | 4/2011 | Liu et al. ....................... 367/124 |
| 2005/0212908 | A1 | 9/2005 | Rodman et al. |
| 2005/0262201 | A1 | 11/2005 | Rudolph et al. |
| 2006/0013416 | A1 | 1/2006 | Truong et al. |
| 2006/0034469 | A1 | 2/2006 | Tamiya et al. |
| 2006/0104458 | A1 | 5/2006 | Kenoyer et al. |
| 2006/0165242 | A1 | 7/2006 | Miki et al. |
| 2006/0238611 | A1 | 10/2006 | Kenoyer et al. |

OTHER PUBLICATIONS

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/: 2001; 26 pages.

"The Wainhouse Research Bulletin"; Apr. 12, 2006; 6 pages; vol. 7, #14.

"VCON Videoconferencing"; http://web.archive.org/web/20041012125813/http://www.itc.virginia.edu/netsys/videoconf/midlevel.html; 2004; 6 pages.

Peter Klein; "Video Workplace Conference"; IEEE Proceedings of Globecom; 1985; pp. 109-112; Siemens AG, Germany.

Shigeki Masaki, Hiroyuki Yamaguchi Hideya Ichihara and Kazunori Shimamura; "A Desktop Teleconferencing Terminal Based on B-ISDN: PMTC"; NTT Review; Jul. 1992; pp. 81-85; vol. 4, No. 4.

C. M. Tan, P. Fletcher, M. A. Beach, A. R. Nix, M. Landmann and R. S. Thoma; "On the Application of Circular Arrays in Direction Finding Part I: Investigation into the estimation algorithms", 1st Annual COST 273 Workshop, May/Jun. 2002; 8 pages.

Ivan Tashev; Microsoft Array project in MSR: approach and results, hftp://research.microsoft.com/users/ivantash/Documents/MicArraysInMSR.pdf; Jun. 2004; 49 pages.

"Press Releases"; Retrieved from the Internet: http://www.acousticmagic.com/press/; Mar. 14, 2003-Jun. 12, 2006; 18 pages; Acoustic Magic.

Marc Gayer, Markus Lohwasser and Manfred Lutzky; "Implementing MPEG Advanced Audio Coding and Layer-3 encoders on 32-bit and 16-bit fixed-point processors"; Jun. 25, 2004; 7 pages; Revision 1.11; Fraunhofer Institute for Integrated Circuits IIS; Erlangen, Germany.

"Polycom Executive Collection"; Jun. 2003; 4 pages; Polycom, Inc.; Pleasanton, CA.

* cited by examiner

AUDIO BASED ON SPEAKER POSITION AND/OR CONFERENCE LOCATION

This application is a continuation-in-part of co-pending application Ser. No. 11/252,188, titled "Video and Audio Conferencing System With Spatial Audio", which was filed on Oct. 17, 2005 whose inventors are Michael L. Kenoyer and William V. Oxford which claims benefit of priority to provisional application Ser. No. 60/619,212 titled "Video Conferencing Speakerphone", which was filed Oct. 15, 2004, whose inventors are Michael L. Kenoyer, Craig B. Malloy, and Wayne E. Mock and which claims benefit of priority to provisional application Ser. No. 60/676,918, titled "Audio and Video Conferencing", which was filed May 2, 2005, whose inventors are Michael L. Kenoyer, Wayne Mock, and Patrick D. Vanderwilt and which claims benefit of priority to provisional application Ser. No. 60/675,965 titled "Video and Audio Conferencing System With Spatial Audio", which was filed Apr. 29, 2005, whose inventors are Michael L. Kenoyer, Wayne E. Mock, and Craig B. Malloy and which claims benefit of priority to provisional application Ser. No. 60/675,962 titled "Audio Based on Speaker Position and/or Conference Location", which was filed Apr. 29, 2005, whose inventor is Michael L. Kenoyer all of which are hereby incorporated by reference, in their entirety as though fully and completely set forth herein.

This application claims priority to U.S. Provisional Patent Application Ser. No. 60/675,962 titled "Audio Based on Speaker Position and/or Conference Location," which was filed Apr. 29, 2005, whose inventor is Michael L. Kenoyer which is hereby incorporated by reference in its entirety as though fully and completely set forth herein.

This application also claims priority to U.S. Provisional Patent Application Ser. No. 60/676,918, titled "Audio and Video Conferencing", which was filed May 2, 2005, whose inventors are Michael L. Kenoyer, Wayne Mock, and Patrick D. Vanderwilt which is hereby incorporated by reference in its entirety as though fully and completely set forth herein.

This application further claims priority to U.S. Provisional Patent Application Ser. No. 60/675,965 titled "Video and Audio Conferencing System With Spatial Audio", which was filed Apr. 29, 2005, whose inventors are Michael L. Kenoyer, Wayne E. Mock, and Craig B. Malloy which is hereby incorporated by reference in its entirety as though fully and completely set forth herein.

BACKGROUND OF THE INVENTION

1. Field of the Invention

The present invention relates generally to audio and, more specifically, to reproducing audio according to a speaker location.

2. Description of the Related Art

Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to another (remote) participant. Each videoconferencing system may also include a display and speaker to reproduce video and audio received from a remote participant. Each videoconferencing system may also be coupled to a computer system to allow additional functionality into the videoconference. For example, additional functionality may include data conferencing (including displaying and/or modifying a document for both participants during the conference).

SUMMARY OF THE INVENTION

In various embodiments, a system may include a first conferencing system with a first speaker and a second speaker. The first conferencing system may be coupled to a second conferencing system and a third conferencing system. In some embodiments, audio from the second conferencing system may be reproduced through the first speaker, and audio from the third conferencing system may be reproduced through the second speaker.

In some embodiments, audio from various other conferencing systems may be distributed to various audio systems at a first conferencing system to better enable the participants at that first conferencing system to discern who is talking. For example, audio from a first participant at a second conferencing system may be reproduced through right speakers on an audio system at the first conferencing system. Audio from a second participant at the second conferencing system may be reproduced through left speakers at the first conferencing system.

In some embodiments, audio from various participants at various conferencing systems may be reproduced on audio system components relative to the location of participants at the conferencing system. For example, audio from a first participant on the left side of a camera at a second conferencing system may be reproduced through left side speakers at the first conferencing system, and audio from a second participant on a right side of the camera at the second conferencing system may be reproduced through right side speakers at the first conferencing system. In some embodiments, if the first and second participants are displayed on the video screen at the same time, audio may be reproduced through speakers at the first conferencing system relative to the location of the participant who is speaking at the second conferencing system.

BRIEF DESCRIPTION OF THE DRAWINGS

A better understanding of the present invention may be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE INVENTION

Incorporation by Reference

U.S. patent application titled "Speakerphone", Ser. No. 11/251,084, which was filed Oct. 14, 2005, whose inventor is William V. Oxford is hereby incorporated by reference in its entirety as though fully and completely set forth herein.

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. patent application titled "Speakerphone Supporting Video and Audio Features", Ser. No. 11/251,086, which was filed Oct. 14, 2005, whose inventors are Michael L. Kenoyer, Craig B. Malloy and Wayne E. Mock is hereby incorporated by reference in its entirety as though fully and completely set forth herein.

U.S. patent application titled "High Definition Camera Pan Tilt Mechanism", Ser. No. 11/251,083, which was filed Oct. 14, 2005, whose inventors are Michael L. Kenoyer, William V. Oxford, Patrick D. Vanderwilt, Hans-Christoph Haenlein, Branko Lukic and Jonathan I. Kaplan, is hereby incorporated by reference in its entirety as though fully and completely set forth herein.

Figure 1A:
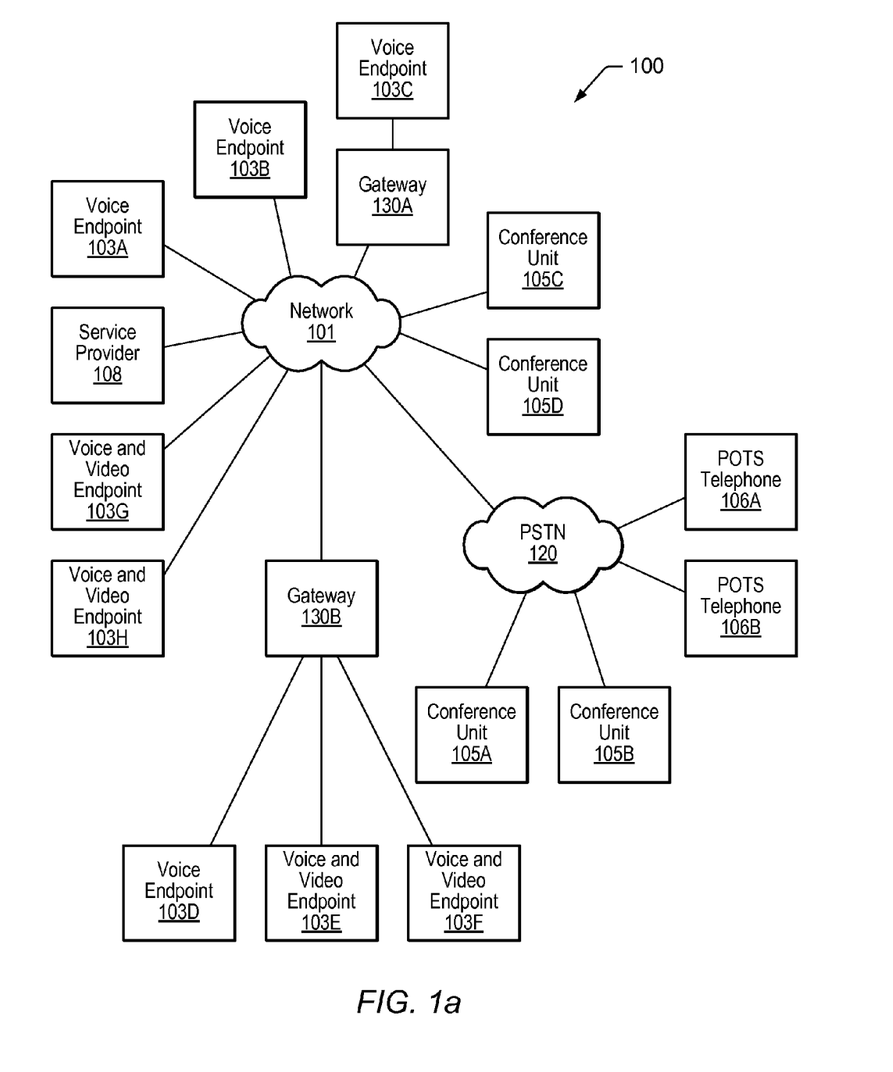
FIG. 1a illustrates a videoconferencing system, according to an embodiment.

FIG. 1a illustrates an embodiment of a videoconferencing system 100. Videoconferencing system 100 may comprise a plurality of participant locations or endpoints. FIG. 1 illustrates an exemplary embodiment of a videoconferencing system 100 which may include a network 101, endpoints 103A-103H (e.g., audio and/or videoconferencing systems), gateways 130A-130B, a service provider 108 (e.g., a multipoint control unit (MCU)), a public switched telephone network (PSTN) 120, conference units 105A-105D, and plain old telephone system (POTS) telephones 106A-106B. Endpoints 103C and 103D-103H may be coupled to network 101 via gateways 130A and 130B, respectively, and gateways 130A and 130B may each include firewall, network address translation (NAT), packet filter, and/or proxy mechanisms, among others. Conference units 105A-105B and POTS telephones 106A-106B may be coupled to network 101 via PSTN 120. In some embodiments, conference units 105A-105B may each be coupled to PSTN 120 via an Integrated Services Digital Network (ISDN) connection, and each may include and/or implement H.320 capabilities. In various embodiments, video and audio conferencing may be implemented over various types of networked devices.

In some embodiments, endpoints 103A-1039H, gateways 130A-130B, conference units 105C-105D, and service provider 108 may each include various wireless or wired communication devices that implement various types of communication, such as wired Ethernet, wireless Ethernet (e.g., IEEE 802.11), IEEE 802.16, paging logic, RF (radio frequency) communication logic, a modem, a digital subscriber line (DSL) device, a cable (television) modem, an ISDN device, an ATM (asynchronous transfer mode) device, a satellite transceiver device, a parallel or serial port bus interface, and/or other type of communication device or method.

In various embodiments, the methods and/or systems described may be used to implement connectivity between or among two or more participant locations or endpoints, each having voice and/or video devices (e.g., endpoints 103A-103H, conference units 105A-105D, POTS telephones 106A-106B, etc.) that communicate through various networks (e.g., network 101, PSTN 120, the Internet, etc.).

In some embodiments, endpoints 103A-103C may include voice conferencing capabilities and include or be coupled to various audio devices (e.g., microphones, audio input devices, speakers, audio output devices, telephones, speaker telephones, etc.). Endpoints 103D-103H may include voice and video communications capabilities (e.g., videoconferencing capabilities) and include or be coupled to various audio devices (e.g., microphones, audio input devices, speakers, audio output devices, telephones, speaker telephones, etc.) and include or be coupled to various video devices (e.g., monitors, projectors, displays, televisions, video output devices, video input devices, cameras, etc.). In some embodiments, endpoints 103A-103H may comprise various ports for coupling to one or more devices (e.g., audio devices, video devices, etc.) and/or to one or more networks.

In some embodiments, conference units 105A-105D may include voice and/or videoconferencing capabilities and include or be coupled to various audio devices (e.g., microphones, audio input devices, speakers, audio output devices, telephones, speaker telephones, etc.) and/or include or be coupled to various video devices (e.g., monitors, projectors, displays, televisions, video output devices, video input devices, cameras, etc.). In some embodiments, endpoints 103A-103H and/or conference units 105A-105D may include and/or implement various network media communication capabilities. For example, endpoints 103A-103H and/or conference units 105C-105D may each include and/or implement one or more real time protocols, e.g., session initiation protocol (SIP), H.261, H.263, H.264, H.323, among others. In an embodiment, endpoints 103A-103H may implement H.264 encoding for high definition (HD) video streams.

In various embodiments, a codec may implement a real time transmission protocol. In some embodiments, a codec (which may mean short for "compressor/decompressor") may comprise any system and/or method for encoding and/or decoding (e.g., compressing and decompressing) data (e.g., audio and/or video data). For example, communication applications may use codecs to convert an analog signal to a digital signal for transmitting over various digital networks (e.g., network 101, PSTN 120, the Internet, etc.) and to convert a received digital signal to an analog signal. In various embodiments, codecs may be implemented in software, hardware, or a combination of both. Some codecs for computer video and/or audio may include MPEG, Indeo™, and Cinepak™, among others.

In some embodiments, a videoconferencing system may be designed to operate with network infrastructures that support T1 capabilities or less, e.g., 1.5 mega-bits per second or less in one embodiment, and 2 mega-bits per second in other embodiments. The videoconferencing system may support HD capabilities. The term "high resolution" includes displays with resolution of 1280×720 pixels and higher. In one embodiment, high-definition resolution may comprise 1280× 720 progressive scans at 60 frames per second, or 1920×1080 interlaced or 1920×1080 progressive. Thus, an embodiment of the present invention may comprise a videoconferencing system with HD "e.g. similar to HDTV" display capabilities using network infrastructures with bandwidths T1 capability or less. The term "high-definition" is intended to have the full breath of its ordinary meaning and includes "high resolution".

Figure 1B:
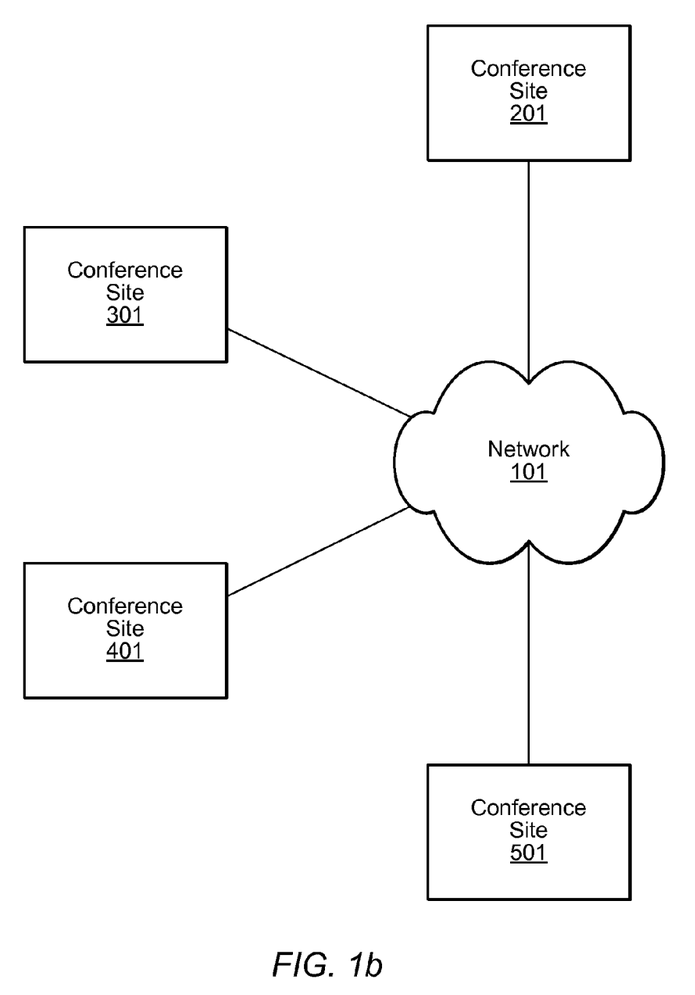
FIG. 1b illustrates an embodiment of a three conferencing systems coupled through a network.

FIG. 1b illustrates an embodiment of four conferencing systems coupled through a network. For example, conferencing system 201, 301, 401, and 501 may be coupled through a network 101.

Figure 2:
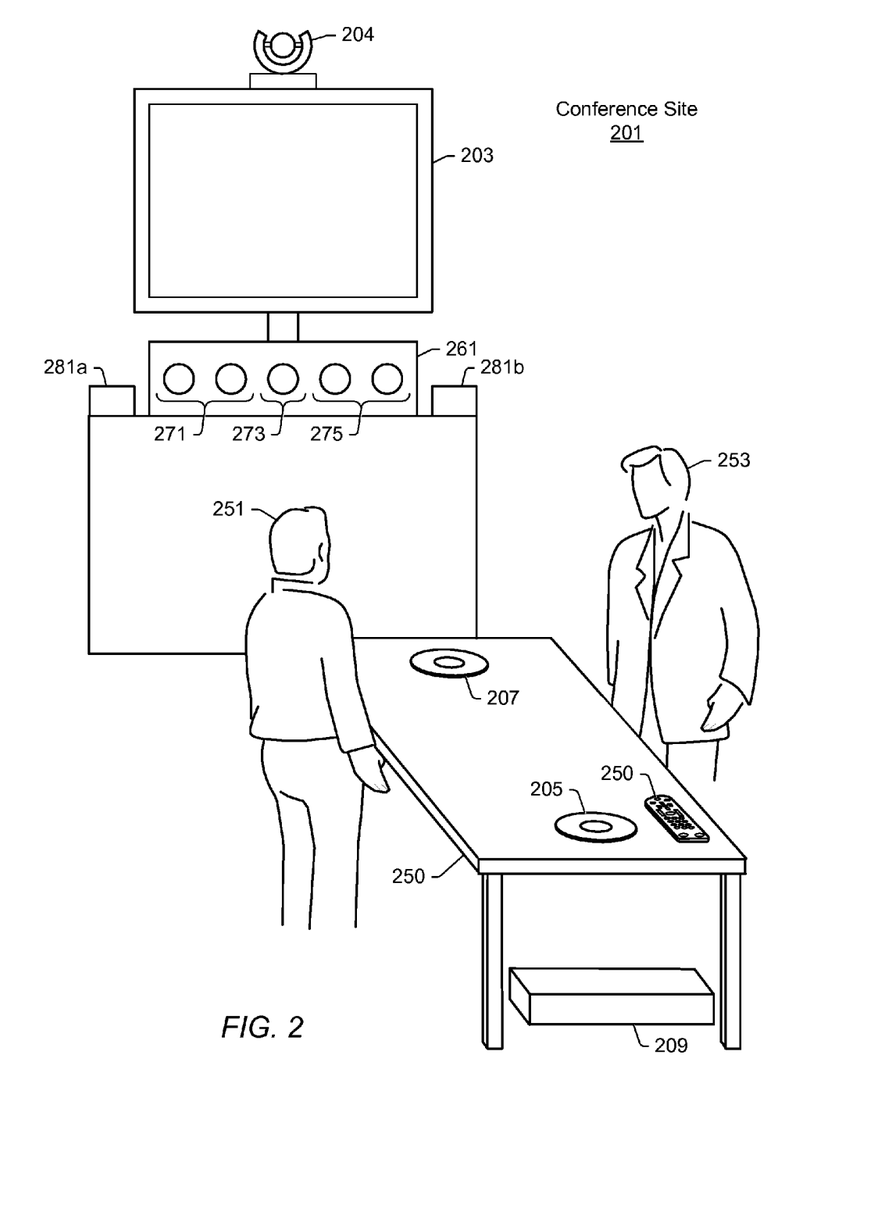
FIG. 2 illustrates an embodiment of a first conferencing system.

FIG. 2 illustrates an embodiment of first conferencing system 201. In some embodiments, first conferencing system 201 may have participants 251, 253 and multiple audio systems (e.g., video audio system 261 and speakerphones 205/207). The videoconferencing system may have a system codec 209 to manage both a speakerphone 205/207 and the various videoconferencing system components. The speakerphones 205/207 and other videoconferencing system components may be coupled to the codec 209 and may receive audio and/or video signals from the system codec 209.

In some embodiments, the participant location may include a camera 204 (e.g., an HD camera) for acquiring images (e.g., of participants 253 and 251) of the participant location. Other cameras are also contemplated. The participant location may also include a display 203 (e.g., an HDTV display). Images acquired by the camera 204 may be displayed locally on the display 203 and may also be encoded and transmitted to other participant locations in the videoconference.

The participant location may also include a sound system 261. The sound system 261 may include multiple speakers including left speakers 271, center speaker 273, and right speakers 275. Other numbers of speakers and other speaker configurations may also be used. The videoconferencing site 201 may also use one or more speakerphones 205/207 which may be daisy chained together.

In some embodiments, the videoconferencing system components (e.g., the camera 204, display 203, sound system 261, and speakerphones 205/207) may be coupled to a system codec 209. The system codec 209 may be placed on a desk or on a floor. Other placements are also contemplated. The system codec 209 may receive audio and/or video data from a network 101. The system codec 209 may send the audio to the speakerphone 205/207 and/or sound system 261 and the video to the display 203. The received video may be HD video that is displayed on the HD display 203. The system codec 209 may also receive video data from the camera 204 and audio data from the speakerphones 205/207 and transmit the video and/or audio data over the network 101 to another conferencing system. The conferencing system may be controlled by a participant through the user input components (e.g., buttons) on the speakerphones 205/207 and/or remote control 250. Other system interfaces may also be used.

Figure 3:
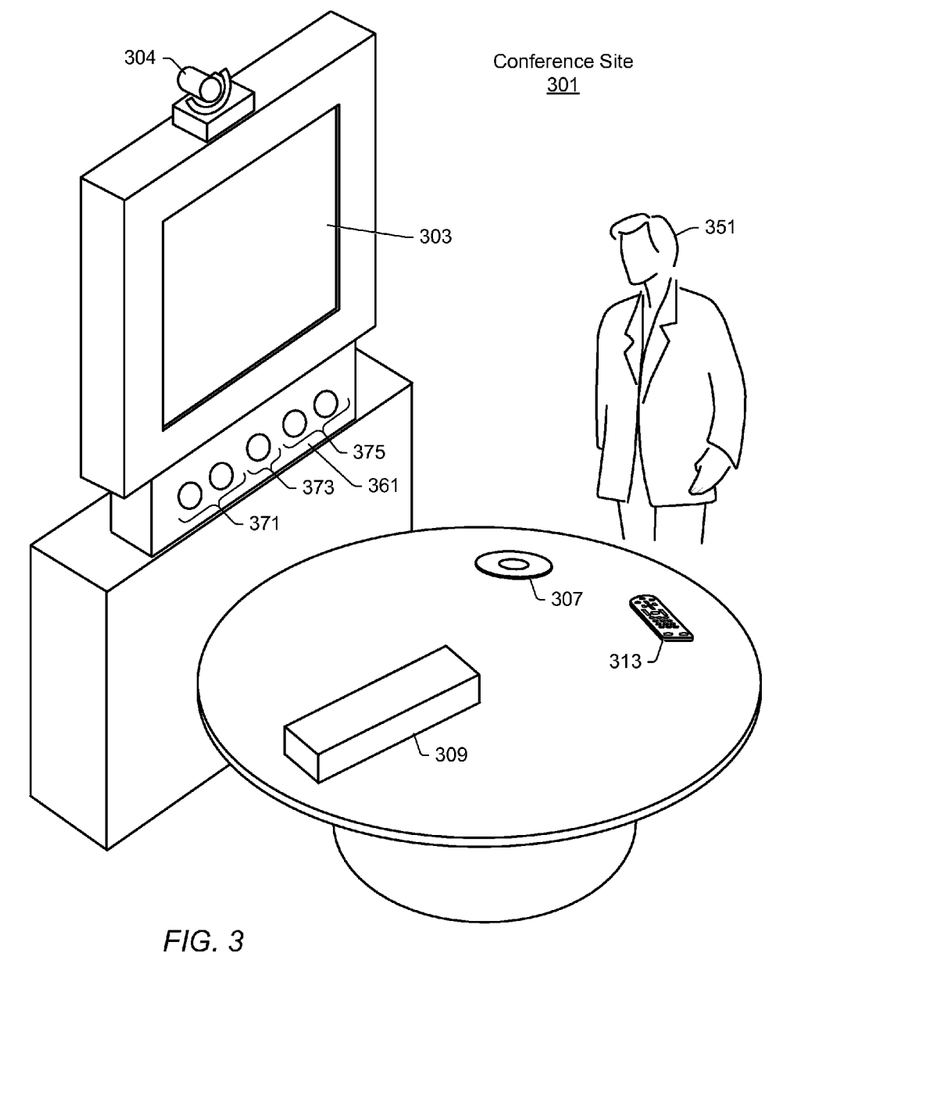
FIG. 3 illustrates an embodiment of a second conferencing system.

FIG. 3 illustrates an embodiment of second conferencing system 301. In some embodiments, second conferencing system 301 may have a participant 351, video audio system 361, codec 309, remote 313, camera 304, display 303, and speakerphone 307. The video audio system 361 may comprise left speakers 371, center speaker 373, and right speakers 375.

Figure 4:
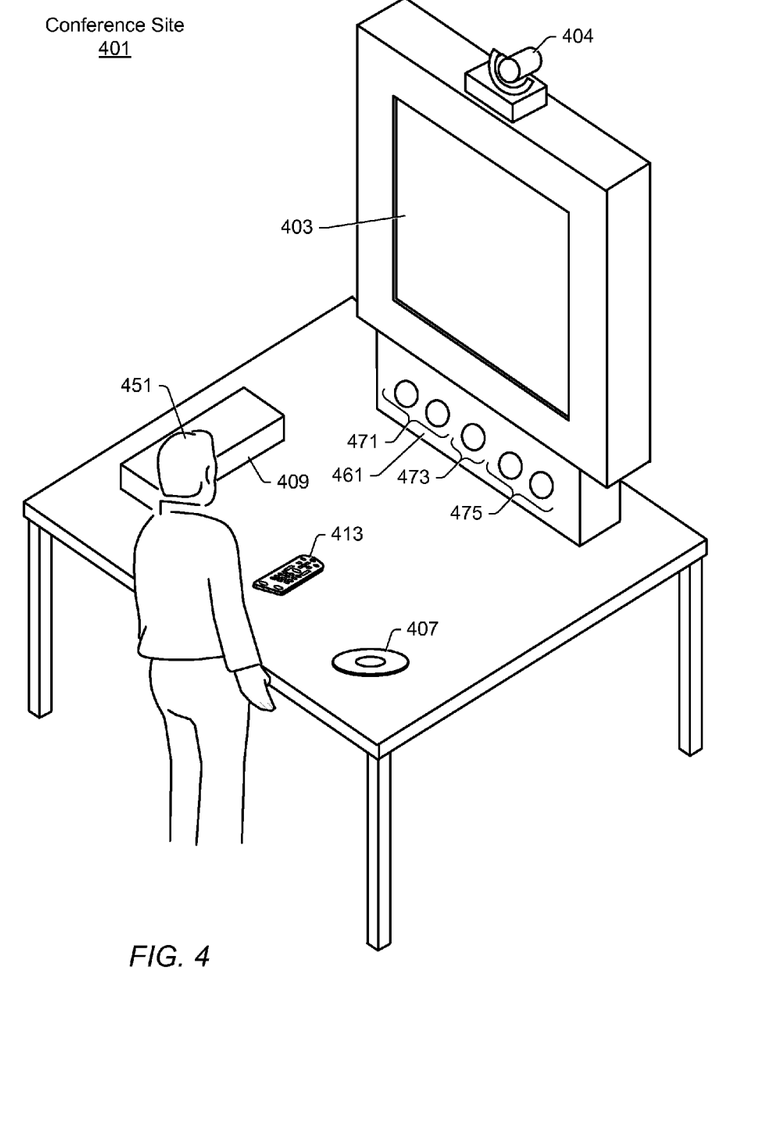
FIG. 4 illustrates an embodiment of a third conferencing system.

FIG. 4 illustrates an embodiment of third conferencing system 401. In some embodiments, third conferencing system 401 may have a participant 451, codec 409, remote 413, display 403, camera 404, video audio system 461 (including left speakers 471, center speakers 473, and right speakers 475), and speakerphone 407.

Figure 5:
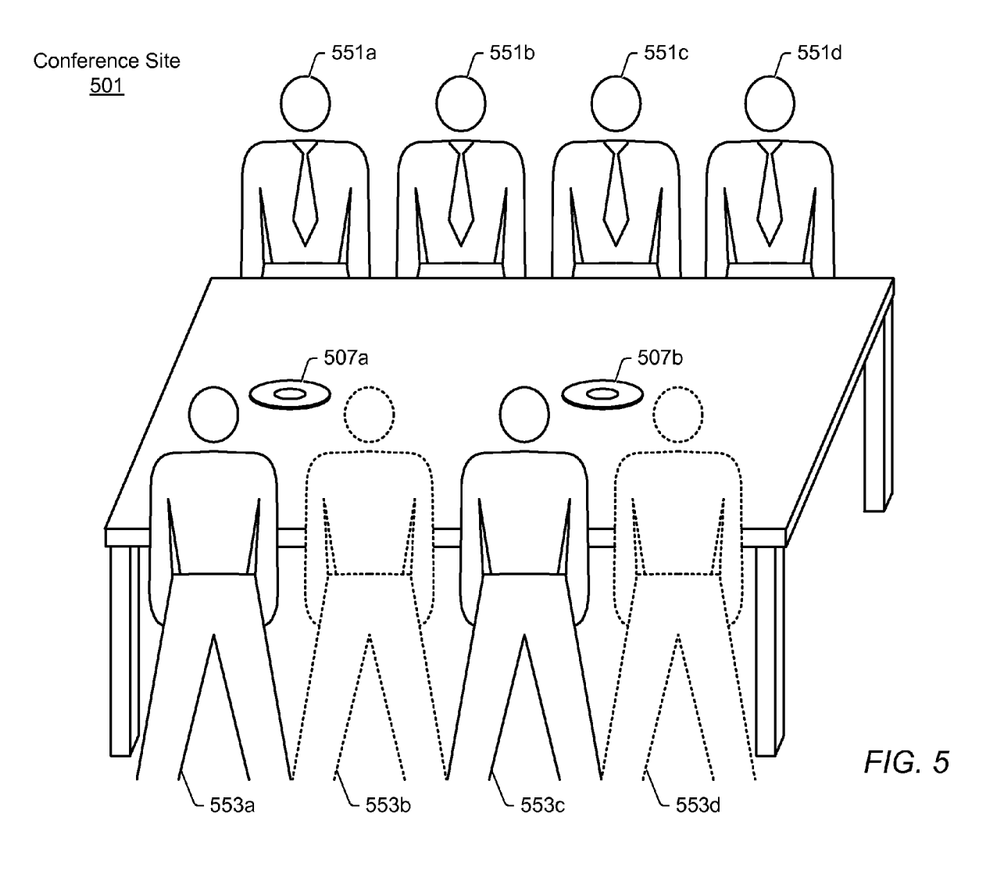
FIG. 5 illustrates an embodiment of a fourth conferencing system.

FIG. 5 illustrates an embodiment of fourth conferencing system 501. In some embodiments, fourth conferencing system 501 may have participants 551a-d, 553a-d and speakerphones 507a-b.

In various embodiments, each of conferencing systems 201, 301, 401, and 501 may be involved in a conference call. If audio from each of the other conferencing systems was reproduced in all of the audio system components at each conferencing system, the participants of the conference at each conferencing system may not be able to easily discern which conferencing system originated the audio currently being reproduced. For example, if audio from conferencing system 301, 401, and 501 is reproduced through video audio system 261 and speakerphones 207 at conferencing system 201, participants 251 and 253 may not be able to easily discern which conferencing system originated the current audio. In some embodiments, audio from various conferencing systems may be distributed to various audio systems at the conferencing system to better enable the participants to discern who is talking. For example, in some embodiments, audio from participant 351 at conferencing system 301 may be reproduced through right speakers 275 at conferencing system 201. Audio from participant 451 at conferencing system 401 may be reproduced through center speaker 273. In some embodiments, audio from the front participants 551a, 551b, 553a, and 553b at conferencing system 501 may be sent through front speakerphone 207a, and audio from back participants 551c, 551d, 553c, 553d may be reproduced through back speakerphone 205 at conferencing system 201. In some embodiments, if audio from each of the conferencing systems is reproduced by a different audio system component at conferencing system 201, participants 251, 253 at conferencing system 201 may be able to discern audio from a specific audio system component as originating from a specific conferencing system.

In some embodiments, audio from various participants at various conferencing systems may be reproduced on audio system components relative to the location of participants at the conferencing system. For example, audio from participant 251 on the left side of the camera 204 (facing the camera) at conferencing system 201 may be reproduced through left side speakers 371 and audio from right side participant 253 may be reproduced through right side speaker 375. As another example, audio from a participant near the camera 204 at conferencing system 201 may be reproduced through a separate set of speakers than audio from a participant further from the camera. In this manner, participant 351 may be better able to discern speakers at a specific conferencing system. For example, if both participants 251 and 253 are displayed on video screen 303 at the same time, audio may be reproduced through speakers relative to the location of the participant who is speaking. In addition, audio from participants at other conferencing systems may be reproduced through various audio system components at conferencing system 301. For example, audio from participant 451 may be reproduced through speaker 373 and audio from participants 551a-d, 553a-d may be reproduced through speakerphone 307. In some embodiments, audio from speakerphone participants may be put through a speakerphone speaker and audio from video participants may be put through the video sound system.

As seen in FIG. 4, audio from participants may be distributed in other configurations. For example, audio from participant 251 may be reproduced through left speakers 471, and audio from participant 253 may be reproduced through center speaker 473 to keep a spatial representation between the video displayed and the audio (speaker displayed on the left side of the screen has corresponding audio through the left side speakers). Audio from participant 351 may be reproduced through right speakers 475, and audio from participants 551*a-d*, 553*a-d* may be reproduced through speakerphone 407.

As seen in FIG. 5, audio from participants of different conferencing systems may be reproduced by the same audio system components (e.g., if the number of conferencing systems exceeds the number of audio system components). For example, audio from participants 351 and 451 may be reproduced through speakerphone 507*b*. Audio from participants 251 and 253 may be reproduced through speakerphone 507*a*.

In various embodiments, audio signals from the various conferencing systems may contain indicators (e.g., location information) corresponding to the conferencing system that originated the audio signal. Controls/software, e.g., found in the integrated unit/codec (209, 309, and 409) as well as other components (e.g., in the circuitry of speakerphones 507*a-b*) may use the information to distribute the audio signals to various audio system components. The audio signals may be distributed through hardware and/or software. In some embodiments, the audio may be distributed through another part of the system. In some embodiments, conferencing systems may detect where a participant is with respect to the system (e.g., by beamforming an audio response of an array of microphones in a camera of the conferencing system). In some embodiments, the location of the participant with respect to the system may be indicated through information sent with the audio signal. The location information may be used to determine which conferencing components to reproduce the audio through. For example, audio from conference participant 351 may be sent through right speakers 275 at conferencing system 201, and then through a different audio system component (e.g., speakerphone 207) if another conferencing system is added to the conference call, or if, for some other reason, right speakers 275 are used for different participants. In some embodiments, audio from participant 351 may continue to be reproduced through right speakers 275 while audio from additional participants is also sent through right speakers 275.

In various embodiments, video conferencing systems may detect a direction of a participant using microphones in audio recording components. In some embodiments, circular speakerphones (e.g., speakerphones 507*a-b*) may have a circular array of microphones along their perimeter and cameras (e.g., cameras 204, 304, and 404) may have microphones in an array in their base. In some embodiments, these microphones may be used to detect the location of a participant who is speaking. For example, the microphones may be beamformed to determine an approximate angle of the participant relative to the speakerphone(s) and cameras and then cross correlated with other beamforming information (e.g., from another device in the room) to determine a location. In some embodiments, the components may be preconfigured (e.g., an orientation of the speakerphone with respect to the participants may be predetermined) and the preconfigured information may be used in conjunction with the beamformed audio to determine a direction of the participants with respect to the component (e.g., speakerphone). This information may be passed with the audio signal and used to reproduce the audio from the participant through a respective conferencing component.

As another example, audio from participant 551*a* may be detected at speakerphone 507*a* before the audio is detected at speakerphone 507*b*. In addition, microphones in the speakerphone closest to participant 551*a* will detect the audio before microphones on the opposite side of the speakerphone 507. Speakerphones 507 may be configured to work together to determine approximate locations of participants relative to the speakerphones. Speakerphones 507 may detect the presence of each other (e.g., using a short burst of audio at a particular frequency that the other speakerphone may detect). In some embodiments, the speakerphones may be pre-aligned (e.g., using markings on the outer casings of the speakerphones).

In some embodiments, other conference equipment may be used with a speakerphone. For example, camera 204 may have microphones used to aim the camera toward a participant who is speaking. These microphones may be used in conjunction with the microphones in one or more speakerphones. In some embodiments, a video conferencing system may not include a speakerphone. Microphone/microphone arrays 281 may be used in addition to or in place of the microphones on speakerphones 207. For example, if there are no speakerphones, the microphones/microphone arrays 281 may locate a participant relative to the video screen. Microphones 281 may also be used in addition to or in place of existing speakerphones. In some embodiments, the microphone/microphone array 281*a* may detect the voice of participant 251 before microphone/microphone array 281*b*.

Figure 6:
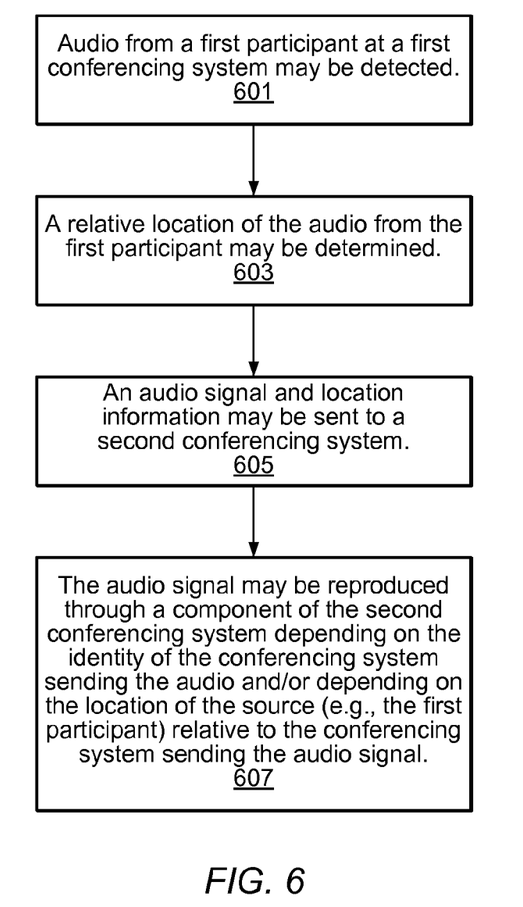
FIG. 6 illustrates a method of reproducing an audio signal in a video conferencing system component relative to a location of the audio signal source, according to an embodiment.

FIG. 6 illustrates a method of reproducing an audio signal in a video conferencing system component relative to a location of the audio signal source, according to an embodiment. It should be noted that in various embodiments of the methods described below, one or more of the elements described may be performed concurrently, in a different order than shown, or may be omitted entirely. Other additional elements may also be performed as desired.

At 601, audio from a first participant at a first video conferencing system may be detected.

At 603, a relative location of the audio from the first participant may be determined. For example, determining the location may include determining if the first participant is on a left side or right side of the first conferencing system (e.g., with respect to a component such as a camera of the first video conferencing system). As another example, determining the location may include determining if the first participant is near a front or a rear of the first conferencing system. In some embodiments, arrays of microphones may be used (e.g., through beamforming) to determine a location of the participant relative to the conferencing system.

At 605, an audio signal and location information may be sent to a second conferencing system. In some embodiments, the location information may include a conferencing system identifier and/or relative location of the participant at the conferencing system (e.g, with respect to the camera). In some embodiments, information may be sent with the audio signal to identify the first conferencing system. The conferencing system sending the audio may send the location information identifying it to the receiving conferencing system or a management system (either at one of the conferencing systems or a stand-alone unit) may keep track of what audio is originating from which conferencing systems and may send location information to the sending and/or receiving conferencing system.

At 607, the audio signal may be reproduced through a component of the second conferencing system depending on the identity of the conferencing system sending the audio and/or depending on the location of the source (e.g., the first participant) relative to the conferencing system sending the audio signal. In some embodiments, the audio component used relative to a location may be predetermined (e.g., right speakers 275 may be pre-assigned to audio from conferencing system 301). In some embodiments, participants may dynamically determine which components to use for the various signals (relative to location information with the signal). In some embodiments, the audio components to use for each incoming audio signal may be determined by software in the codec or another management system.

Figure 7:
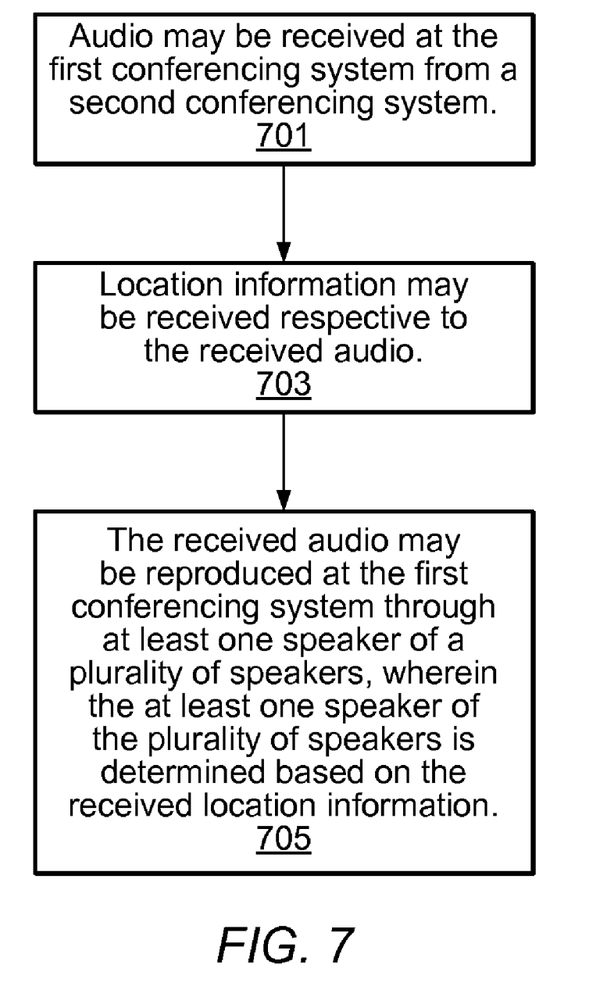
FIG. 7 illustrates a method of receiving an audio signal and location information for reproduction of the audio signal, according to an embodiment.

FIG. 7 illustrates a method of receiving an audio signal and location information for reproduction of the audio signal, according to an embodiment. It should be noted that in various embodiments of the methods described below, one or more of the elements described may be performed concurrently, in a different order than shown, or may be omitted entirely. Other additional elements may also be performed as desired.

At 701, audio may be received at the first conferencing system from a second conferencing system.

At 703, location information may be received respective to the received audio. For example, the location information may be determined using a microphone array at the second conferencing system (the audio response from the microphone array may be beamformed to determine the location information of an audio source relative to the microphone array. The location information may also (or as an alternate) indicate the video conferencing system which is sending the audio.

At 705, the received audio may be reproduced at the first conferencing system through at least one speaker of a plurality of speakers, wherein the at least one speaker of the plurality of speakers is determined based on the received location information.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system, comprising:
   a first conferencing system, comprising:
   a first speaker;
   a second speaker;
   wherein the first conferencing system is coupled to a second conferencing system and a third conferencing system over a network;
   wherein the first conferencing system, the second conferencing system, and the third conferencing system are configured to communicate in a conference;
   wherein audio from the second conferencing system is reproduced through at least one of the first speaker and the second speaker and audio from the third conferencing system is reproduced through the other of the first speaker and the second speaker.

2. The system of claim 1, wherein the audio from the second conferencing system and the audio from the third conferencing system is reproduced through the first speaker and the second speaker of the first conferencing system depending on a location of a source of the audio with respect to a component at the second conferencing system and a component at the third conferencing system.

3. The system of claim 1, wherein the audio from a participant at the second conferencing system is reproduced through the first speaker if the participant is on a right side of an audio recording component at the second conferencing system and is reproduced through the second speaker if the participant is on a left side of an audio recording component of the second conferencing system.

4. The system of claim 1, wherein the audio from a participant at the second conferencing system is reproduced through the first speaker if the participant is near a front side of the second conferencing system and is reproduced through the second speaker if the participant is near a rear of the second conferencing system.

5. The system of claim 1, wherein the audio from the second conferencing system and the audio from the third conferencing system includes an indicator which indicates which conferencing system the audio is from.

6. The system of claim 1, wherein the audio from the second conferencing system and the audio from the third conferencing system includes an indicator which indicates a respective location of an audio source producing the audio at the respective conferencing system.

7. The system of claim 1, wherein the second conferencing system comprises a microphone array at the second conferencing system, wherein an audio response from the microphone array is operable to be beamformed to determine a location of an audio source relative to the microphone array.

8. The system of claim 1, further comprising a management system operable to determine an identity of a conferencing system sending audio to the first conferencing system.

9. The system of claim 8, wherein the management system is further operable to transmit the identity to the first conferencing system and wherein the identity is used by the first conferencing system to reproduce the audio in the first speaker or the second speaker relative to a predetermined placement of audio based on received identities.

10. A method, comprising:
    detecting audio from a participant at a first conferencing system;
    sending an audio signal and location information to a second conferencing system, wherein the audio signal is configured for reproduction through a component of the second conferencing system, and wherein the component is selected depending on the location information.

11. The method of claim 10, further comprising determining a relative location with respect to the first conferencing system of the audio from the participant.

12. The method of claim 11, wherein the relative location is determined using a microphone array at the first conferencing system, wherein an audio response from the microphone array is operable to be beamformed to determine the relative location of an audio source relative to the microphone array.

13. The method of claim 11, wherein the location information indicates the relative location of the audio from the participant.

14. The method of claim 10, wherein the location information indicates the conferencing system which is sending the audio.

15. A method, comprising:
    receiving audio at a first conferencing system from a second conferencing system;
    receiving location information respective to the received audio; and
    reproducing the received audio at the first conferencing system through at least one speaker of a plurality of speakers, wherein the at least one speaker of the plurality of speakers is determined based on the received location information.

16. The method of claim 15, wherein the location information represents a relative location of an audio source relative to a component at the second conferencing system, wherein the component is a microphone array; wherein the location information is determined using the microphone array at the second conferencing system, and wherein an audio response from the microphone array is beamformed to determine the relative location of an audio source relative to the microphone array.

17. The method of claim 15, wherein the location information indicates the conferencing system which is sending the audio.

18. The method of claim 17, wherein the location information is an identity of a conferencing system sending audio to the first conferencing system as determined by a management system.

19. The method of claim 17, wherein the location information indicating the conferencing system sending the audio is determined by the conferencing system sending the audio.

20. The method of claim 15, wherein the location information includes the relative location of an audio source relative to a component at the second conferencing system and the identity of the second conferencing system.

21. A conferencing system, comprising:
    at least one first speaker;
    at least one second speaker; and
    a network port, wherein the conferencing system is coupled to a second and a third conferencing system over a network via the network port, wherein the conferencing system, the second conferencing system, and the third conferencing system are configured to communicate in a conference;
    wherein audio from the second conferencing system is reproduced through only the at least one first speaker and wherein audio from the third conferencing system is reproduced through only the at least one second speaker.

22. The conferencing system of claim 21, wherein the at least one first speaker comprises a plurality of speakers.

23. The conferencing system of claim 22, wherein audio from the second conferencing system is reproduced through the plurality of speakers depending on a location of a source of the audio with respect to a component at the second conferencing system.

24. The conferencing system of claim 21, wherein the at least one first speaker comprises a left speaker for the conferencing system, and wherein the at least one second speaker comprises a right speaker for the conferencing system.

25. The conferencing system of claim 21, further comprising:
    at least one third speaker;
    wherein the conferencing system is coupled to a fourth conferencing system over the network via the network port, wherein audio from the fourth conferencing system is reproduced through only the at least one third speaker.

26. The conferencing system of claim 21, further comprising:
    a display, wherein the display is configured to provide video from the second conferencing system on a first portion of the display and provide video from the third conferencing system on a second portion of the display, wherein the first portion of the display is on a first side of the display, wherein a position of the at least one first speaker corresponds to the first side, wherein the second portion of the display is on a second different side of the display, wherein a position of the at least one second speaker corresponds to the second side.

27. The conferencing system of claim 26, wherein the first side of the display is left, wherein the at least one first speaker comprises a left speaker, wherein the second side of the display is right, wherein the at least one second speaker comprises a right speaker.

28. A method for providing audio in a conference, comprising:
    receiving audio at a first conferencing system from a second conferencing system;
    receiving audio at the first conferencing system from a third conferencing system;
    reproducing the received audio at the first conferencing system through at least one first speaker and at least one second speaker, wherein said reproducing the received audio comprises reproducing audio from the second conferencing system via only the at least one first speaker and reproducing audio from the third conferencing system via only the at least one second speaker.

29. The method of claim 28, wherein the at least one first speaker comprises a plurality of speakers.

30. The method of claim 29, wherein said reproducing the received audio comprises reproducing the received audio from the second conferencing system through the plurality of speakers depending on a location of a source of the audio with respect to a component at the second conferencing system.

31. The method of claim 28, wherein the at least one first speaker comprises a left speaker for the conferencing system, and wherein the at least one second speaker comprises a right speaker for the conferencing system.

32. The method of claim 28, further comprising:
    receiving audio at the first conferencing system from a third conferencing system;

wherein said reproducing the received audio comprises reproducing the received audio from the third conferencing system via only at least one third speaker.

33. The method of claim 28, further comprising:
receiving video at the first conferencing system from the second conferencing system;
receiving video at the first conferencing system from the third conferencing system;
reproducing the received video on a display, wherein said reproducing the received video comprises reproducing video from the second conferencing system on a first portion of a display and reproducing video from the third conferencing system on a second portion of the display, wherein the first portion of the display is on a first side of the display, wherein a position of the at least one first speaker corresponds to the first side, wherein the second portion of the display is on a second different side of the display, wherein a position of the at least one second speaker corresponds to the second side.

34. The method of claim 33, wherein the first side of the display is left, wherein the at least one first speaker comprises a left speaker, wherein the second side of the display is right, wherein the at least one second speaker comprises a right speaker.

* * * * *

UNITED STATES PATENT AND TRADEMARK OFFICE
CERTIFICATE OF CORRECTION

| | | |
|---|---|---|
| PATENT NO. | : 8,237,770 B2 | Page 1 of 1 |
| APPLICATION NO. | : 11/406071 | |
| DATED | : August 7, 2012 | |
| INVENTOR(S) | : Michael L. Kenoyer and William V. Oxford | |

It is certified that error appears in the above-identified patent and that said Letters Patent is hereby corrected as shown below:

Title Page:

Item (74) Attorney, Agent, or Firm:
Delete "Kower" and substitute -- Kowert --.

Signed and Sealed this
Twenty-seventh Day of November, 2012

David J. Kappos
*Director of the United States Patent and Trademark Office*